July 26, 1966  L. BENDER  3,263,008
POST-ASSEMBLY MOLDING
Filed Aug. 7, 1962  3 Sheets-Sheet 1

INVENTOR
LOUIS BENDER
BY Louis Altman
ATTORNEY

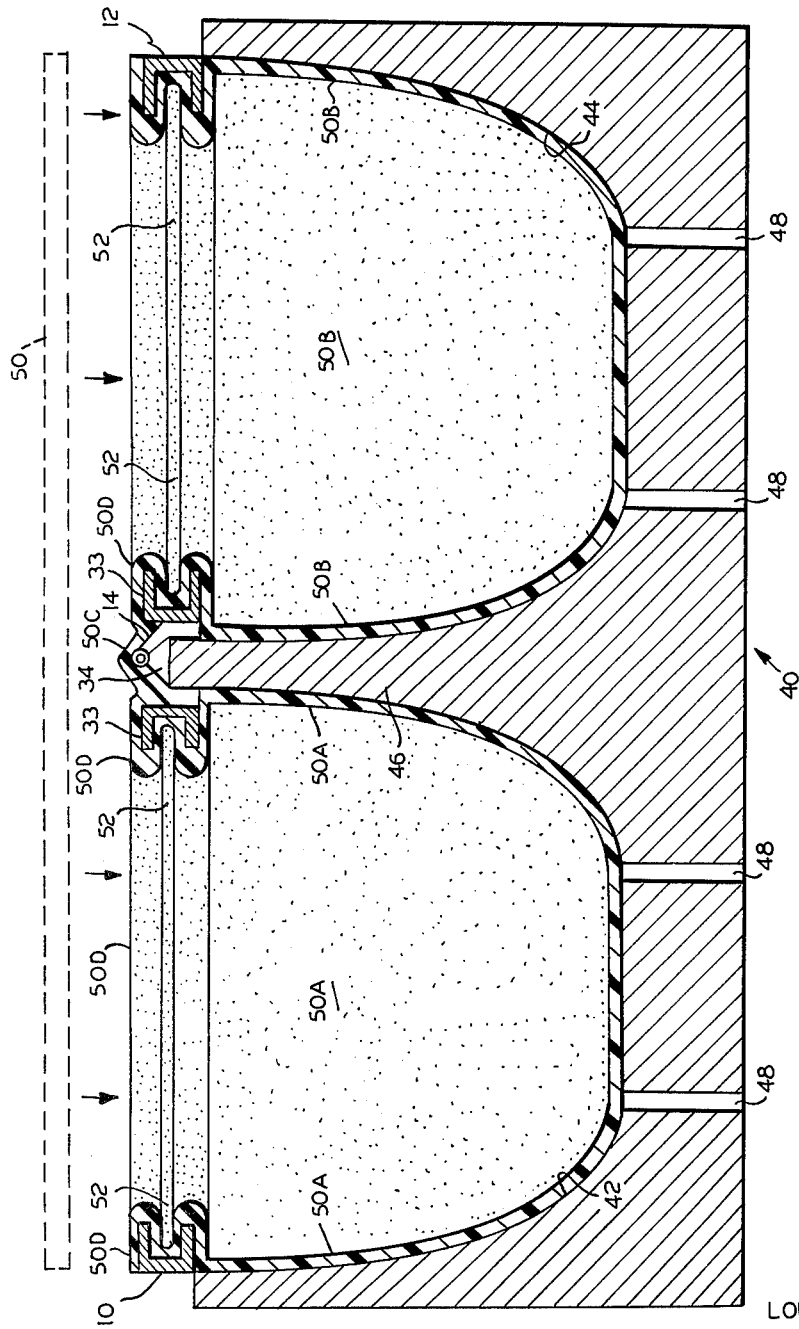

July 26, 1966  L. BENDER  3,263,008
POST-ASSEMBLY MOLDING
Filed Aug. 7, 1962  3 Sheets-Sheet 3
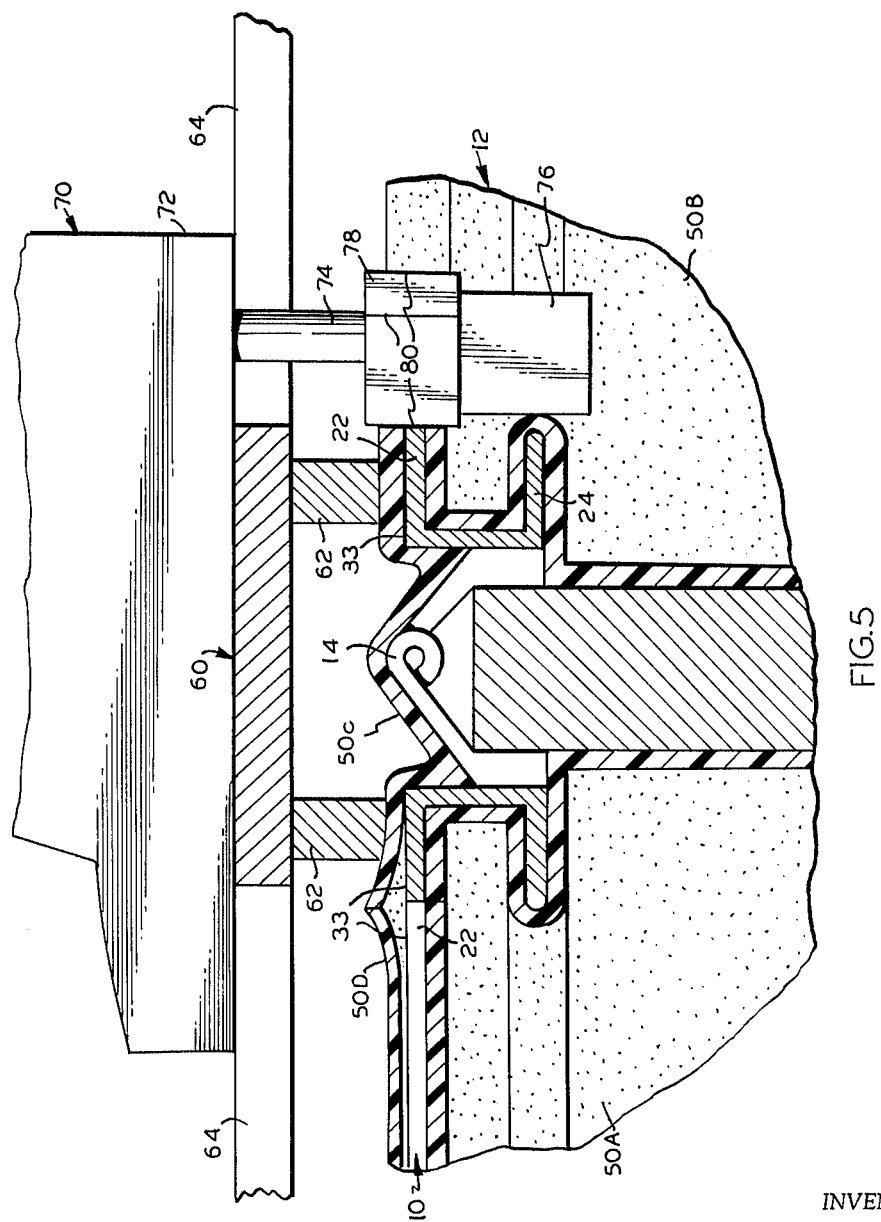
INVENTOR
LOUIS BENDER
BY *Louis Altman*
ATTORNEY

United States Patent Office 3,263,008
Patented July 26, 1966

3,263,008
POST-ASSEMBLY MOLDING
Louis Bender, Plainfield, N.J., assignor of one-half to Leo Miller, Plainfield, N.J.
Filed Aug. 7, 1962, Ser. No. 215,308
4 Claims. (Cl. 264—90)

This invention relates to a process for the manufacture of carrying cases, particularly those that are molded from thermoplastic materials by, for example, the vacuum-forming process.

Such cases frequently consist of two half-members hinged together. For example, one larger half-member may comprise the bottom of the case, while the smaller one constitutes a lid. In other instances, the two half-members may be of approximately equal size. In either event, each half-member generally consists of a metal half-frame which forms the rim of the half-member, and a plastic wall which is molded into assembly with the metal half-frame to form the body of the half-member.

In the past, such cases have been manufactured by first molding each half-member wall separately into assembly with its respective half-frame, and thereafter assembling the two completed half-members into a full carrying case by hinging the two half-members together. The hinges are commonly affixed by spot welding, or in some cases by riveting, to the metal half-frames.

This method of manufacturing carrying cases has the following two disadvantages. First, the process of welding or riveting the hinges to the half-frames is more difficult and cumbersome when this operation must be performed on half-frames which have been fully assembled with the molded walls. Secondly, since there is a certain minimum amount of plastic waste accompanying each separate molding operation, the molding of the two half-members in separate operations increases the amount of waste.

It is therefore broadly an object of this invention to improve the manufacture of molded carrying cases. More specifically, the objectives of this invention include the reduction of the amount of plastic waste incurred in the molding process, and also the avoidance of the difficulties of affixing the carrying case hinges after the plastic walls have been molded. A further object of the invention is to provide an improved mold for carrying out the process of this invention.

These objectives may be realized by means of a method of fabricating a carrying case which comprises the steps of first assembling a frame by hinging together the two half-frames, and thereafter molding the two half-member walls into assembled relationship each with a respective one of the half-frames. In accordance with an illustrative embodiment demonstrating the process aspects of this invention, there is provided a mold formed with two half-member-wall-molding cavities, each arranged to co-operate with a respective one of two assembled, spaced-apart half-frames to form a respective one of the half-member walls thereon, separated by a partition arranged to protrude into and be accommodated within the space between the half-frames to form a barrier therebetween.

The various features, objects, and advantages briefly summarized above may be more fully appreciated by reference to the following detailed description, when read in conjunction with the accompanying drawings, in which:

FIG. 4 is a sectional view illustrating the step of vacuum-forming a carrying case in accordance with method aspects of the invention, as well as a mold in accordance with article aspects of the invention;

And FIG. 5 is a similar sectional view on an enlarged scale illustrating the step of removing the excess plastic material in accordance with method aspects of this invention.

Figure 1:
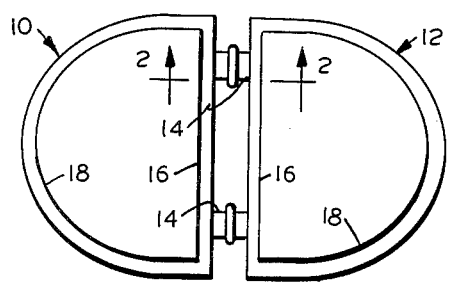
FIG. 1 is a top plan view of a frame assembly for use in manufacturing a carrying case in accordance with the method of this invention.

Referring now specifically to the drawings, FIG. 1 shows a pair of half-frames 10 and 12 for a carrying case. In accordance with the method of this invention, the half-frames 10 and 12 have first been assembled by being secured together with a pair of hinges 14. Each of the half-frames comprises one straight section 16 to which the hinges are secured, plus a curved section 18 which demarcates the contours of the carrying case to be formed thereon.

Figure 2:
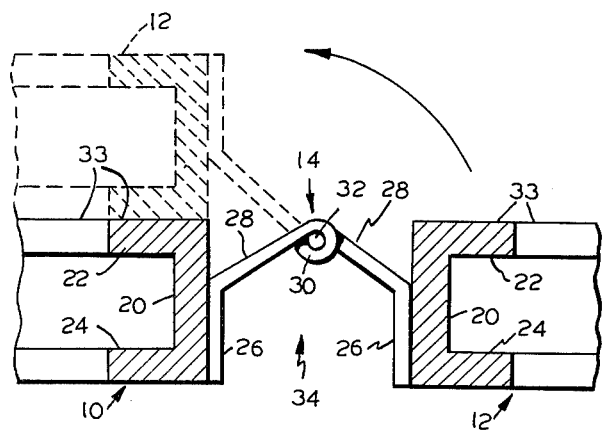
FIG. 2 is an enlarged sectional view taken along the lines 2—2 of FIG. 1 and illustrating the hinge structure of the frame assembly.

In the view of FIG. 2 it is seen that the half-frames 10 and 12 have a channel-shaped cross-section which includes a central web 20 and channel arms 22 and 24. Each hinge 14 includes a pair of flanges 26 which are secured, as by spot welding or by riveting, to the central webs 20 of the respective half-frames 10 and 12. These flanges 26 merge into respective hinge arms 28 which extend diagonally upwardly and outwardly from the central webs 20 and terminate in curled fingers 30 which form an enclosure for a hinge pin 32 that pivotally secures the two hinge arms 28 together. The axis of the hinge pin 32 lies in the plane of the upper surfaces 33 of the two half-frames 10 and 12 so that the frame assembly 10, 12, 14 can be closed. For example, the right half-frame 12 can be swung over and atop the left half-frame 10 as indicated by the arrow, so that the upper, or closure, surfaces 33 meet as shown by the broken line representation. The advantage of this type of hinge for the practice of this invention is that, because the hinge arms 28 extend diagonally away from their respective half-frames 10 and 12, the resulting frame assembly 10, 12, 14, when open as indicated by the solid lines, has a space 34 between the central webs 20. This space 34 permits the use of a special mold in accordance with article aspects of this invention, as will be described hereinafter.

Figure 3:
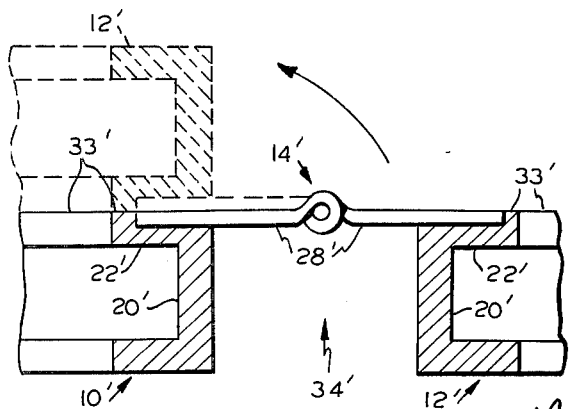
FIG. 3 is a sectional view similar to that of FIG. 2, illustrating an alternative type of hinge structure.

An alternative form of hinge structure, which accomplishes the same objective of spacing apart the two half-frames 10 and 12 when the latter are in open relationship, is seen in FIG. 3. In this embodiment it is seen that the hinge arms 28' lack any separately defined flanges, and instead are fitted into suitable recesses in the arms 22'. This keeps the hinges flush with the surfaces 33' of the half-frames 10' and 12' for closure purposes. Thus when the right half-frame 12' is swung over and atop the left half-frame 10' as indicated by the arrow, they meet smoothly along a plane as shown by the broken line representation. In this case it is the fact that the hinge arms 28' project perpendicularly from the central webs 20' that creates the space 34' therebetween.

FIG. 4 illustrates a novel vacuum-forming mold 40 for use with the method of this invention. The mold is formed with two distinct upwardly opening cavities 42 and 44 designed for the molding of half-member walls, which are arranged to cooperate with the respective half-frames 10 and 12 to form half-member walls thereon. The two cavities 42 and 44 are separated by an upstanding partition 46 which is arranged to protrude into and be accommodated within the space 34 between the half-frames 10 and 12, thus forming a barrier therebetween so that the two half-member walls are formed separately. Small openings 48 are bored through the bottom of the mold 40 so that a partial vacuum can be applied through these openings to the interior of the molding cavities 42 and 44 to form the half-member walls by the well known process of vacuum-forming.

In accordance with the method of this invention, after the frame has been assembled by securing together the two half-frames 10 and 12 by means of the hinges 14, this assembly is placed over the mold 40 in the hinge-open position so that each half-frame 10 and 12 is directly over the respective appropriately shaped half-member-wall-molding cavity 42 and 44 in order to cooperate therewith to form a half-member wall on the half-frame. The partition 46 then protrudes upwardly into, and is accommodated within, the space 34 which exists between the half-frames 10 and 12 by virtue of the particular hinge construction described above. It will be appreciated that in this manner, the partition 46 separates the two cavities 42 and 44 so that individual half-member walls can be separately but simultaneously molded therein.

The next step is to take a single sheet 50 of vacuum-formable thermoplastic material such as polystyrene, large enough to cover the entire frame assembly 10, 12, 14 and heat it to a soft, plastic condition. The sheet 50 is then lowered over the two half-frames 10 and 12 and the two molding cavities 42 and 44, as indicated by the arrows. When the sheet 50 is in position to cover that entire assembly, a partial vacuum is applied to the small openings 48 in the well known manner to cause the soft plastic material 50 to be drawn into the interiors of the channel sections of the half-frame members 10 and 12 (as seen at locations 52) so as to form a close-fitting assembly therewith. The plastic 50 is also drawn down into the two molding cavities 42 and 44 to form respective half-member walls 50A and 50B therein. Thus it is seen that the two half-member walls 50A and 50B are formed simultaneously, yet they are separated by the upstanding partition 46 into the two distinct structures desired. In addition to enabling two separate half-member walls 50A and 50B to be formed at the same time and in the same operation, this method has the additional advantage of permitting both half-member walls 50A and 50B to be formed from a single sheet of plastic 50.

The next step is the removal of the excess plastic material 50C which covers the hinges 14 and the material 50D over the closure surfaces 33 and other parts of the frame assembly 10, 12 which are outside the interior of the completed half-members 10, 50A and 12, 50B. It will readily be appreciated that if the plastic 50C is allowed to remain over the area of the hinges 14, it will impair the opening and closing action of the hinge, and if it is allowed to remain on the closure surfaces 33 it will prevent the half-members from closing smoothly along those surfaces. As seen in FIG. 5, removal can be accomplished while the finished carrying case is still on the mold, by placing thereover a wooden table 60 which stands on short legs 62 (not all of which are shown) and is formed with openings 64 that conform to the contours of the half-members 10, 50A and 12, 50B. This table 60 serves as supporting surface for a router 74 which includes a powerhead unit 72 resting on the table, and has a drive shaft 74 depending therefrom into the upper portion of the interior of one of the half-members 12, 50B. The lower end of the router drive shaft 74 carries a cylindrical follower 76 which rides along the plastic-covered edge of the channel arm 24 to enable the router 70 to accurately follow the contours of the half-member opening. Above the cylindrical follower 76 is a cutter 78 having several sharp edges 80 which project sufficiently far beyond the surface of the follower 76 to cut through the plastic material and down to the metal surface at the edge of the upper channel arm 22. In the drawing, it is seen that the left half-member 10, 50A has already been treated in this manner so that the plastic material 50D all around the closure surface 33 of the left half-frame 10 has been severed along the edge of the upper channel arm 22. This material 50D can then simply be peeled away from the closure surface 33 in the manner illustrated. After similar treatment has been accomplished on the right half-frame 12, 50B the material 50C remaining over the hinges 14 will be peeled away along with the plastic 50D removed on either side thereof.

From this discussion it is apparent that each molding operation inherently leaves a certain amount of excess plastic at the borders of the object being molded, and this excess must be stripped away. Thus there is not only an extra operation involved, but some of the plastic employed becomes waste material. Two of the advantages of the present method, therefore, are that when both of the half-member walls are molded in a single operation, first, it is necessary to remove excess or waste plastic only once, and second, by having a common border waste area in the vicinity of the hinge for both of the half-members, the amount of waste is reduced over that which would occur if the two half-members were molded separately and a full border waste area were created separately for each half-member.

Another of the advantages of this method is that when the stage of the process is reached when the fully formed half-members (frames and walls assembled in integral units) are lifted from the vacuum-forming mold, it is not necessary at this point to begin the operation of spot welding or riveting hinges to complete the frame assembly. This would be inconvenient in view of the fact that the frames, with the molded wall members now assembled therewith, are considerably more cumbersome and inconvenient to work with. This necessity, however, has been avoided by the expedient of assembling the frame and hinge members first, as hereinabove described, and subsequently using the novel mold and the novel method steps discussed herein to complete the molding of the two half-member walls simultaneously, and in a single operation, and with a single sheet of plastic, after the half-frames have already been hinged together.

The foregoing illustrates preferred ways of practicing this invention; but since there may be countless other specific applications of the same principles, the scope of protection is not limited to any particular examples but is defined more generally in the appended claims.

The invention claimed is:

1. A method of fabricating a carrying case including two half-members hinged together; comprising the steps of:
   (a) assembling a frame by hinging together two half-frames;
   (b) thereafter placing the frame assembly in operative association with the vacuum-forming mold formed with two half-member-wall-molding cavities each arranged to cooperate with a respective one of the half-frames to form respective half-member walls thereon;
   (c) thereafter placing a single sheet of vacuum-formable plastic in operative association with the two half-frames and the two molding cavities;
   (d) and thereafter vacuum-drawing the plastic sheet into assembled relationship with the frame assembly and into the two molding cavities to form both respective half-member walls simultaneously therein, thereby forming a composite case made up of said frame and said drawn plastic.

2. A method of fabricating a carrying case including two half-members hinged together; comprising the steps of:
   (a) assembling a frame by hinging together two half-frames with hinge means arranged so that the half-frames open into spaced-apart relationship;
   (b) thereafter placing the frame assembly in opened condition in operative associataion with a vacuum-forming mold formed with two half-member-wall-molding cavities separated by by a partition, the molding cavities being arranged to cooperate each with a respective one of the half-frames to form respective half-member walls thereon, and the partition being arranged to protrude into and be accommodated within the space between the half-frames to form a barrier therebetween;

(c) thereafter placing a single sheet of vacuum-formable plastic in operative association with the two half-frames and the two molding cavities;

(d) and thereafter vacuum-drawing the plastic sheet into assembled relationship with the frame assembly and into the two molding cavities to form both respective half-member walls simultaneously therein, separated by the partition, thereby forming a composite case made up of said frame and said drawn plastic.

3. A method of fabricating a carrying case including two half-members hinged together; comprising the steps of:

(a) assembling a frame by hinging together two half-frames with hinge means arranged so that the half-frames open into spaced-apart relationship;

(b) thereafter placing the frame assembly in opened condition in operative association with a vacuum-forming mold formed with two half-member-wall-molding cavities separated by a partition, the molding cavities being arranged to cooperate each with a respective one of the half-frames to form respective half-member walls thereon, and the partition being arranged to protrude into and be accommodated within the space between the half-frames to form a barrier therebetween;

(c) thereafter placing a single sheet of vacuum-formable plastic in operative association with the two half-frames and the two molding cavities;

(d) thereafter vacuum-drawing the plastic sheet into assembled relationship with the frame assembly and into the two molding cavities to form both respective half-member walls simultaneously therein, separated by the partition;

(e) and thereafter removing the plastic material from the hinge means and from the surfaces of the frame assembly outside the interior of the half-members, thereby forming a composite case made up of said frame and said drawn plastic.

4. A method of fabricating a carrying case including two half-members hinged together; comprising the steps of:

(a) assembling a frame by hinging together two half-frames with hinge means arranged so that the half-frames open into spaced-apart relationship;

(b) thereafter placing the frame assembly in opened condition upon a vacuum-forming mold formed with two upwardly opening half-member-wall-molding cavities separated by an upstanding partition, the molding cavities being arranged to cooperate each with a respective one of the half-frames to form respective half-member walls thereon, and the partition being arranged to protrude upwardly into and be accommodated within the space between the half-frames to form a barrier therebetween;

(c) thereafter placing a single sheet of vacuum-formable plastic over the two half-frames and the two molding cavities;

(d) thereafter vacuum-drawing the plastic sheet into assembled relationship with the frame assembly and down into the two molding cavities to form both respective half-member walls simultaneously therein, separated by the partition;

(e) and thereafter removing the plastic material from the hinge means and from the surfaces of the frame assembly outside the interior of the half-members, thereby forming a composite case made up of said frame and said drawn plastic.

References Cited by the Examiner

UNITED STATES PATENTS

| 1,531,504 | 3/1925 | Roberts | 18—56 |
| 2,007,548 | 7/1935 | Sampson. | |
| 2,873,227 | 2/1959 | Olson et al. | 18—56 |
| 2,876,498 | 3/1959 | Nason | 18—56 |
| 2,878,524 | 3/1959 | Fink | 18—56 |
| 3,007,206 | 11/1961 | Griswold | 18—56 |
| 3,098,548 | 7/1963 | Bialo | 190—49 |
| 3,155,356 | 11/1964 | Montgomery | 248—99 |
| 3,165,178 | 1/1965 | Pelavin et al. | 190—49 |
| 3,175,793 | 3/1965 | Kennedy | 248—99 |

ROBERT F. WHITE, *Primary Examiner.*

ALEXANDER H. BRODMERKEL, *Examiner.*

M. R. DOWLING, *Assistant Examiner.*